(12) United States Patent
Bytheway (10) Patent No.: US 12,339,239 B2
(45) Date of Patent: Jun. 24, 2025

(54) X-RAY DIFFRACTION IMAGING DETECTOR HAVING MULTIPLE ANGLED INPUT FACES

(71) Applicant: BRUKER TECHNOLOGIES LTD., Migdal HaEmek (IL)

(72) Inventor: Richard Thake Bytheway, Durham (GB)

(73) Assignee: Bruker Technologies Ltd., Migdal HaEmek (IL)

( * ) Notice: Subject to any disclaimer, the term of this patent is extended or adjusted under 35 U.S.C. 154(b) by 155 days.

(21) Appl. No.: 18/307,834

(22) Filed: Apr. 27, 2023

(65) Prior Publication Data
US 2024/0361259 A1 Oct. 31, 2024

(51) Int. Cl.
G01T 1/20 (2006.01)
G01N 23/20008 (2018.01)
G01N 23/207 (2018.01)

(52) U.S. Cl.
CPC ..... *G01N 23/20008* (2013.01); *G01N 23/207* (2013.01); *G01T 1/2002* (2013.01); *G01T 1/20185* (2020.05)

(58) Field of Classification Search
CPC ............ G01N 23/20008; G01N 23/207; G01T 1/2002; G01T 1/20185
See application file for complete search history.

(56) References Cited

U.S. PATENT DOCUMENTS

| | | | |
|---|---|---|---|
| 5,150,394 A | 9/1992 | Karellas | |
| 6,649,914 B1 | 11/2003 | Moorman et al. | |
| 7,981,158 B2 | 7/2011 | Fitz et al. | |
| 9,048,102 B2 | 6/2015 | Gunjishima et al. | |
| 9,074,992 B2 | 7/2015 | Ozawa et al. | |
| 9,166,008 B2 | 10/2015 | Gunjishima et al. | |
| 9,335,282 B2 | 5/2016 | Omote et al. | |
| 9,658,174 B2 | 5/2017 | Omote et al. | |

(Continued)

FOREIGN PATENT DOCUMENTS

| TW | I408260 B | 9/2013 |
|---|---|---|
| WO | 2003048752 A1 | 6/2003 |

(Continued)

OTHER PUBLICATIONS

Hamamatsu Photonics K.K., "X-ray TDI Camera," product information, pp. 1-8, Nov. 2021.

*Primary Examiner* — David P Porta
*Assistant Examiner* — Mamadou Faye
(74) *Attorney, Agent, or Firm* — Meitar Patents Ltd.; Daniel Kligler (57) ABSTRACT

A detector assembly of an X-ray system, the detector assembly includes: (a) an optical sensor having a first surface, the optical sensor configured to receive optical radiation impinging on the first surface, and to produce an electrical signal responsively to the optical radiation, (b) a fiber optic plate (FOP) disposed over the first surface of the optical sensor, the FOP includes: (i) one or more optical fibers disposed at an acute angle relative to a normal to the first surface, the one or more optical fibers are configured to convey the optical radiation to the optical sensor, and (ii) a second surface, which is oblique to the first surface, and (c) a scintillator layer disposed on the second surface of the FOP and configured to convert an X-ray beam into the optical radiation.

18 Claims, 3 Drawing Sheets

(56) References Cited

U.S. PATENT DOCUMENTS

| | | |
|---|---|---|
| 10,816,487 B2 | 10/2020 | Matney et al. |
| 11,038,024 B2 | 6/2021 | Nagao et al. |
| 2004/0012688 A1* | 1/2004 | Tinnerino ................ H04N 5/32 |
| | | 348/E3.02 |
| 2010/0208872 A1 | 8/2010 | Karellas |
| 2011/0001052 A1 | 1/2011 | Struye |
| 2019/0254616 A1 | 8/2019 | Yun et al. |
| 2022/0340480 A1* | 10/2022 | Nakayama ........... C09K 11/616 |

FOREIGN PATENT DOCUMENTS

| | | |
|---|---|---|
| WO | 2016076270 A1 | 5/2016 |
| WO | 2018191753 A1 | 10/2018 |
| WO | 2021108715 A1 | 6/2021 |

\* cited by examiner

X-RAY DIFFRACTION IMAGING DETECTOR HAVING MULTIPLE ANGLED INPUT FACES

FIELD OF THE INVENTION

The present invention relates generally to X-ray analysis, and particularly to methods and systems for improving resolution in X-ray diffraction imaging (XRDI).

BACKGROUND OF THE INVENTION

Various techniques have been developed for improving resolution in X-ray diffraction imaging (XRDI), also known as X-ray topography, for detecting crystalline defects in semiconductor substrates.

For example, U.S. Pat. No. 9,335,282 describes an X-ray topography apparatus capable of separating a desired characteristic X-ray which enters a sample from an X-ray which is radiated from an X-ray source, and increasing an irradiation region of the desired characteristic X-ray. The X-ray topography apparatus includes: the X-ray source for radiating the X-ray from a fine focal point, the X-ray containing a predetermined characteristic X-ray; an optical system including a multilayer mirror with a graded multilayer spacing which corresponds to the predetermined characteristic X-ray, the optical system being configured to cause the X-ray reflected on the multilayer mirror to enter the sample; and an X-ray detector for detecting a diffracted X-ray. The multilayer mirror includes a curved reflective surface having a parabolic cross section, and the fine focal point of the X-ray source is provided onto a focal point of the curved reflective surface.

SUMMARY OF THE INVENTION

An embodiment of the present invention that is described herein provides a detector assembly of an X-ray system; the detector assembly includes: (a) an optical sensor having a first surface, the optical sensor configured to receive optical radiation impinging on the first surface, and to produce an electrical signal responsively to the optical radiation, (b) a fiber optic plate (FOP) disposed over the first surface of the optical sensor, the FOP includes: (i) one or more optical fibers disposed at an acute angle relative to a normal to the first surface, the one or more optical fibers are configured to convey the optical radiation to the optical sensor; and (ii) a second surface, which is oblique to the first surface; and (c) a scintillator layer disposed on the second surface of the FOP and configured to convert an X-ray beam into the optical radiation.

In some embodiments, the detector assembly includes an additional FOP disposed over the first surface, the additional FOP including: (i) additional optical fibers disposed parallel to the normal, and (ii) a third surface, which is parallel to the first surface and has an additional scintillator layer disposed thereon. In other embodiments, the X-ray beam includes: (i) a first X-ray beam emitted from a sample at a first direction having a first angle relative to the normal, and (ii) a second X-ray beam diffracted from the sample at a second direction having a second angle relative to the normal, larger than the first angle, and in response to receiving the second X-ray beam, the FOP and the additional FOP are configured to produce, on the first surface, first and second spots, respectively, and the second spot is smaller than the first spot. In yet other embodiments, in response to receiving the first X-ray beam, the FOP and the additional FOP are configured to produce on the first surface third and fourth spots, respectively, wherein the fourth spot is smaller than the third spot.

In some embodiments, the one or more optical fibers of the FOP are disposed at a first oblique angle relative to the first surface, and at a second oblique angle relative to the second surface. In other embodiments, the first oblique angle and the second oblique angle are equal.

There is additionally provided, in accordance with an embodiment of the present invention, a system for X-ray analysis, the system includes: (a) a source assembly, which is configured to direct a first X-ray beam to impinge on a surface of a sample, and (b) a detector assembly, including: (i) an optical sensor having a first surface, (ii) a fiber optic plate (FOP) disposed over the first surface, the FOP including: one or more optical fibers disposed at an acute angle relative to a normal to the first surface, and a second surface, which is oblique to the first surface, and (iii) a scintillator layer disposed on the second surface of the FOP. The scintillator layer is configured to convert a second X-ray beam, which is emitted from the sample responsively to the first X-ray beam, into optical radiation, and the optical fibers in the FOP are configured to convey the optical radiation to the optical sensor, and the optical sensor is configured to receive the optical radiation impinging on the first surface and to produce an electrical signal responsively to the optical radiation.

In some embodiments, the system includes a processor, which is configured to perform the X-ray analysis based on the electrical signal. In other embodiments, the second X-ray beam includes a first beam emitted from the sample at a first direction, parallel to the normal, and a second beam diffracted from the sample at a second direction, oblique to the normal, and in response to receiving the first and second beams, (i) the FOP is configured to produce on the first surface first and second spots, respectively, and (ii) the additional FOP is configured to produce on the first surface third and fourth spots, respectively, and the processor is configured to use the second and third spots for performing the X-ray analysis.

In some embodiments, the sample is positioned between the source assembly and the detector assembly, and the source assembly is configured to direct the first X-ray beam to impinge on a third surface of the sample, and the detector assembly is configured to detect the second X-ray beam that had entered the sample at the third surface, diffracted while passing through the sample, and exited the sample at a fourth surface that is opposite to the third surface, and based on the second X-ray beam, the processor is configured to produce an X-ray diffraction (XRD) image of the sample.

In some embodiments, based on the XRD image, the processor is configured to detect one or more defects in the sample, and at least one of the detected defects includes a defect in a crystal located between the third and fourth surfaces. In other embodiments, the source assembly and the detector assembly are facing the surface of the sample, and the source assembly is configured to direct the first X-ray beam to impinge on the surface of the sample at a first acute angle, and the detector assembly is configured to detect the second X-ray beam diffracted from the surface at a second acute angle, and based on the second X-ray beam, the processor is configured to produce an X-ray diffraction (XRD) image of the sample.

There is further provided, in accordance with an embodiment of the present invention, a method for X-ray analysis, the method includes directing a first X-ray beam to impinge on a surface of a sample. A second X-ray beam is detected.

The second X-ray beam is emitted from the sample responsively to the first X-ray beam, using a detector assembly, including: (a) an optical sensor having a first surface, and (b) a fiber optic plate (FOP) disposed over the first surface, the FOP including at least: (i) one or more optical fibers disposed at an acute angle relative to a normal to the first surface, and (ii) a second surface, which is oblique to the first surface. A second X-ray beam is converted into optical radiation. The optical radiation is conveyed to the first surface of the optical sensor, and an electrical signal is produced responsively to the optical radiation.

There is additionally provided, in accordance with an embodiment of the present invention, a method for producing a detector assembly of an X-ray system, the method includes receiving a fiber optic plate (FOP) that includes: (i) one or more optical fibers disposed at an acute angle relative to a normal to a first surface of the FOP, and (ii) a second surface, which is oblique to the first surface. A scintillator layer is disposed on the second surface of the FOP for converting an X-ray beam into optical radiation. The FOP is disposed over a third surface of an optical sensor for conveying the optical radiation to the optical sensor.

In some embodiments, the method includes disposing the one or more optical fibers at a first oblique angle relative to the first surface, and at a second oblique angle relative to the second surface. In other embodiments, the first oblique angle and the second oblique angle are equal.

The present invention will be more fully understood from the following detailed description of the embodiments thereof, taken together with the drawings in which:

DETAILED DESCRIPTION OF EMBODIMENTS

Overview

X-ray diffraction imaging (XRDI), also known as X-ray topography, may be used for detecting defects in a lattice of a crystalline sample such as a semiconductor wafer, based on analyzing the intensity of the X-rays diffracted from the wafer.

Embodiments of the present invention that are described herein provide methods and systems for improving detection capability of defects in a crystalline sample, by improving the resolution of an image produced using an XRDI system.

In some embodiments, an XRDI system (also referred to herein as an X-Ray topography system, or as a system, for brevity) comprises one or more source assemblies, at least one of the source assemblies comprises one or more X-ray tubes, which are configured to emit one or more respective X-ray beams. Each of the source assemblies is configured to direct the incident X-ray beam to impinge, at an incidence angle, on a given (e.g., lower) surface of a sample, such as a crystalline silicon wafer.

In some embodiments, the system may have two different configurations for performing the XRDI using a transmission mode and a reflection mode, respectively. In the transmission mode, the incident X-ray beam is diffracted by crystalline planes while passing through the wafer and exits the wafer at the upper surface of the wafer, opposite to the lower surface. Note that in the transmission mode, the incident X-ray beam is directed at an angle between about 0° and 30° relative to both sides of a normal to the wafer surface. In other words, the incident beam is directed at a right angle or a relatively large acute angle (e.g., about 80°) relative to the lower surface of the wafer.

In the reflection mode, the incident X-ray beam is directed to the upper surface of the wafer at a small acute angle, e.g., between about 0° and 45° relative to the upper surface. The incident X-ray beam is diffracted by crystalline planes, and subsequently, exits from the upper surface of the wafer at: (i) approximately the same small acute angle (in case the diffracting planes are parallel to the surface), so that the directions of the incident beam and the diffracted beam are symmetric relative to the normal, or (ii) at an angle different from that of the incident beam, when the beam is diffracted from planes that are incline to the surface.

In some embodiments, the system comprises a detector assembly having one or more detectors. Each detector is configured to detect the X-ray beam diffracted from the wafer. In an embodiment, the detector assembly is configured to produce one or more electrical signals in response to detecting the diffracted X-ray beams. The structure of the detector assembly is described in more detail below.

In some embodiments, the system comprises a processor, which is configured, based on the electrical signals provided by the detector, to produce an XRD image of the wafer at the region irradiated by the incident X-ray beam. Moreover, based on the electrical signals, the processor is configured to detect one e or more defects in the crystalline wafer, and to display the detected defects to a user of the system.

In some embodiments, the system comprises: (i) a wafer stage, which is configured, based on a control signal from the processor, to set and adjust the position of the wafer relative to the incident beam, in order to perform the XRDI at a region of interest in the wafer, and (ii) a source stage configured to adjust the incidence angle by moving the source assembly relative to the sample.

In some embodiments, the detector assembly comprises (i) an optical sensor, and (ii) one or more fiber optic plates (FOPs) disposed on an outer surface of the optical sensor, and (iii) a scintillator layer, which is disposed on the outer surface of each FOP, and is configured to convert the X-rays received from the wafer to an optical radiation.

In some embodiments, each FOP comprises (a) an input surface (which is the aforementioned outer surface of the FOP) configured to receive the X-ray beam diffracted from the wafer and converted to optical radiation by the scintillator layer, (b) optical fibers configured to convey the optical radiation, and (c) an output surface configured to output the conveyed optical radiation to the optical sensor, which produces the electrical signal responsively to receiving the optical radiation, so as to produce the XRD image by the processor, as described above.

In principle, the input and output surfaces of the FOP can be parallel to one another, and to the surfaces of the wafer and the optical sensor, and the orientation (e.g., longitudinal axis) of the optical fibers can be perpendicular to these surfaces. In this configuration, however, the diffracted beam impinging on the scintillator layer at the acute angle, results in a spot size larger than that of a diffracted beam impinging on the scintillator layer at a right angle. Moreover, the spot broadening is enhanced in small acute angles, e.g., in the reflection-mode XRDI configuration, as described above.

In some embodiments, the detector assembly may comprise one or more FOPs having a different geometry. In one implementation, the output surface can still be parallel to the surface of the optical sensor, but the input (i.e., outer) layer of the FOP is oblique to the input layer. Moreover, the optical fibers are disposed at: (i) a first acute angle relative to the output surface of the FOP, and (ii) a second acute angle relative to the input surface of the FOP. In an embodiment, the first acute angle equals to the second acute angle, so as to minimize distortion of the optical radiation at each of (and between) the input and output surfaces, but in another embodiment, the first and second acute angles may have a different size.

In some embodiments, the angle between the input and output surfaces of the FOP may be set in accordance with the configuration of the system and the XRDI application. For example, in the reflection configuration having a small angle (e.g., about 30°) of the incident beam relative to the wafer surface, the angle of the diffracted beam relative to the wafer surface is approximately 30°, and therefore, the input surface of the FOP and the scintillator layer are disposed at angle of about 60° relative to the input surface. In this configuration the diffracted beam impinges on the scintillator layer at approximately a right angle, and thereby minimizing the spot size and allowing the processor to obtain high resolution of the XRD image.

In some embodiments, in addition to the FOP having non-parallel input and output surfaces, the detector assembly may comprise at least one of: (i) the aforementioned FOP having parallel input and output surfaces, and (ii) other FOPs having a different oblique angle between the input and output surfaces.

In some embodiments, based on a suitable configuration selected from any of the above options, the processor is configured to control at least one of the wafer stage and the source stage in order to minimize the spot size of the optical radiation conveyed by the optical fibers to the optical sensor. By applying these techniques, the processor is configured to improve the resolution of the XRD images produced by the system.

System Description

Figure 1:
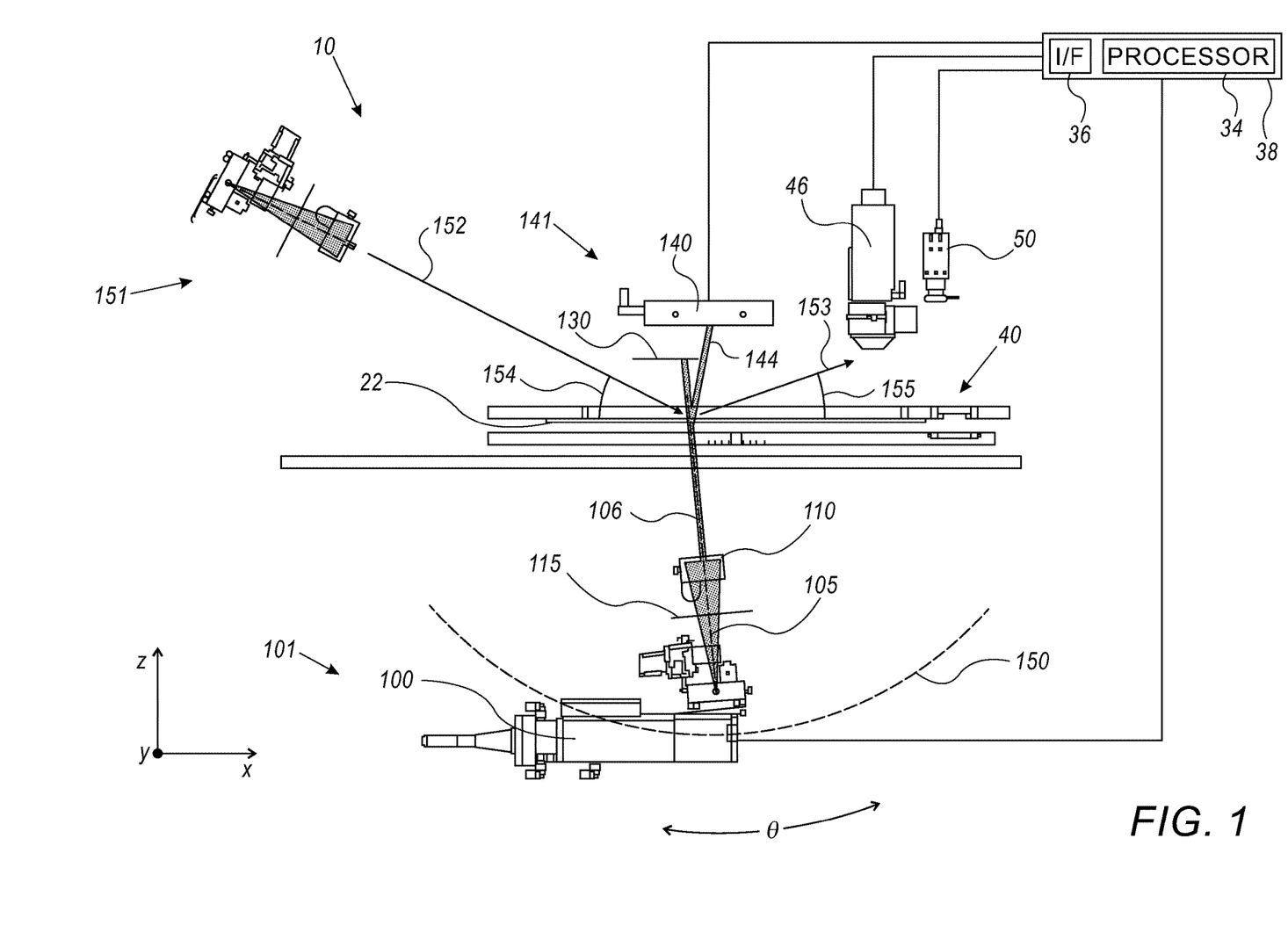
FIG. 1 is a schematic side view of an X-ray diffraction imaging (XRDI) system, in accordance with an embodiment of the present invention.

FIG. 1 is a schematic side view of an X-ray topographic system 10, in accordance with an embodiment of the present invention. System 10, also referred to herein as an X-ray diffraction imaging (XRDI) system, is configured to inspect a sample in question, such as a semiconductor wafer 22 having a crystalline structure, and to detect defects, such as crystalline defects in the lattice of wafer 22.

In the context of the present disclosure and in the claims, the terms "sample" and "wafer" are used interchangeably and refer to any suitable sample in question. For example, a single crystal silicon wafer, substrates made from a compound semiconductor, for example, those comprising elements of the third and fifth column of the periodic table of elements, also known as III-V substrates, such as gallium-arsenide (GaAs), with lattice mismatched epitaxial layers typically used in opto-electronic devices, gallium-nitride (GaN) and other III-nitride film stacks on Si wafers or silicone-carbide (Sic) substrates for opto-electronic and power-electronic devices, and any other suitable types of substrates.

In some embodiments, the term "crystalline defect" refers to various types of distortions and defects in the lattice of the crystalline wafer. For example, micro-cracks, line defects such as dislocations, planar defects such as stacking faults, and volume defects related to voids, porosity and impurities.

In some embodiments, system 10 comprises a source assembly 101 having one or more X-ray tubes, in the present example, a single X-ray tube 100, which is configured to direct one or more X-ray beams 105 to impinge, at an oblique angle or a right angle, on a lower surface (shown in FIG. 2 below) of wafer 22 that is facing source assembly 101. Source assembly 101 further comprises a high-voltage power supply unit (PSU) (not shown) configured to drive the excitation source of X-ray tube 100.

In some embodiments, X-ray tube 100 comprises a low-power microfocus source having a spot size smaller than about 100 µm at a power smaller than 100 W, or a mid-power normal focus source having a 1 mm spot-size at 2-3 kW, or a high-brightness rotating anode source having a spot-size of about 100 µm at 1-2 kW or high energy, with a larger spot-size, e.g., up to 10 kW with a 1 mm source.

In some embodiments, X-ray tube 100 comprises an anode made from a metal, which is configured to emit high energy X-rays. Solid anodes are typically made from molybdenum (Mo) having a Kα energy emission of 17 keV typically operated at 50-60 kV. The Mo-based anode is configured to produce X-rays capable of penetrating wafer 22 or other suitable types of samples.

In other embodiments, the anode of X-ray tube 100 may comprise any other type of solid material suitable for different applications. For example, the anode may be made from other materials such as silver (Ag) having a Kα energy emission of 22 keV. The Ag-based and In-based anodes may be operated at voltages larger than 50 kV; such high energy X-ray beams are useful for imaging other types of wafers described above.

In other embodiments, the anode of X-ray tube 100 may comprise metals and alloys that have low melting points and be a liquid at or near room temperature. For example, the anode may consist of an indium (In) alloy having a Kα energy emission of about 25 keV.

In some embodiments, X-ray tube 100 is configured to emit X-rays having a suitable energy range and power flux into X-ray optics (not shown). In some embodiments, system 10 comprises a motorized rotation stage 150 having a rotation axis, e.g., along a Y-axis of an XYZ coordinate system of system 10.

In some embodiments, rotation stage 150 is further configured to adjust the angle of X-ray beam 105 relative to the surface of wafer 22, so as to move X-ray beam 105 between different diffraction planes of the crystal. In such embodiment, system 10 is configured to inspect the different diffraction planes of the crystal structure so as to detect and optionally image one or more defects, such as long-range variation of the lattice planes of wafer 22.

In the context of the present disclosure, the terms "rotation stage" and "motion assembly" are used interchangeably and refer to a stage moving X-ray tube 100 of source assembly 101.

In some embodiments, system 10 comprises a motorized slit assembly, referred to herein as a slit 110, which is associated with X-ray tube 100, and is made from a material opaque to at least part (and typically all) of the X-ray spectrum of beam 105.

In some embodiments, system 10 comprises a filter 115, which is mounted between X-ray tube 100 of source assembly 101 and the lower surface of wafer 22. Filter 115 may comprise one or more layers of materials, also referred to herein as "films," configured to attenuate the intensity of a selected spectral portion of the X-ray beam, which may reduce the quality of the image acquired by a detector 140 described below.

Example implementations of filter 115 are described in detail, for example, in U.S. Pat. No. 10,816,487, whose disclosure is incorporated herein by reference.

In some embodiments, X-ray tube 100, filter 115 and slit 110 are all mounted on rotation stage 150. X-ray tube 100 and slit 110 are configured to shape beam 105 in accordance with the requirements of the respective X-ray diffraction application. In the present example, beam 105 is shaped to obtain an incident X-ray beam 106, which is configured to impinge of the lower surface of wafer 22, as will be described in detail below.

In some embodiments other optical elements such as diffractive optics e.g., single crystals or reflective optics such as multilayer mirrors, may be mounted on rotation stage 150 so as to adapt the angular range of X-ray beam 105 incident on the surface of wafer 22.

In some embodiments, system 10 comprises a movable platform, in the present example, an X-Y-φ stage 40, which is configured to move wafer 22 (mounted thereon) relative to incident X-ray beam 106. Stage is configured to move wafer 22 along the X-axis and the Y-axis of the XYZ coordinate system and to apply rotation φ (not shown) about an axis normal to the surface of wafer 22 (e.g., the Z-axis).

In some embodiments, wafer 22 is typically placed on stage 40 using a handling robot (not shown), which comprises three moving tables. In the present example, a lower table for the X axis, a middle plate for the Y axis, and an upper plate for the φ rotation axis. All three plates have an opening so as to allow incident X-ray beam 106 to imping on the lower surface of wafer 22.

In some embodiments, system 10 comprises a processing unit 38 having an interface 36 and a processor 34. Typically, processor 34 comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory. Interface 36 is configured to exchange signals between processor 34 and entities of system 10 as will be described below.

In some embodiments, the X-rays of incident X-ray beam 106 are entering wafer 22 at the lower surface. Subsequently, the X-rays are diffracted while passing through wafer 22, and exit as an X-ray beam 144 from an upper surface of wafer 22 (shown in FIG. 2 below) that is opposite the lower surface.

In some embodiments, system 10 comprises one or more detector assemblies for detecting X-rays diffracted from wafer 22. In the present example, a detector assembly 141 is configured to detect the X-rays in a high-speed imaging mode, and an X-ray camera 46 is configured to detect the X-rays in a high-resolution imaging mode. In some embodiments, system 10 may comprise one or more additional motion stages (not shown) configured to position one or both of detector assembly 141 and camera 46 to intercept the diffracted beam. Assembly 141 and camera 46 are described in detail below, and it is noted that system 10 is configured to carry out the XRDI in both transmission mode and reflection modes described herein.

In the example of FIG. 1, in the transmission mode configuration, source assembly 101 is used for directing incident X-ray beam 105 using the transmission mode, in which the X-Rays are directed to the lower surface of wafer 22 (facing source assembly 101), penetrate through the entire thickness (along the Z-axis) of wafer 22 and diffracted by crystallographic planes of the wafer, and exit from the upper surface wafer 22 (facing detector assembly 141 and camera 46) as beam 144. Note that the X-ray photons of beam 144 may be detected using detector assembly 141 or camera 46 depending on the XRDI application (e.g., high high-speed imaging mode or high-resolution imaging mode, as described above).

Moreover, the reflection mode configuration is overlaid in FIG. 1 in order to show both modes for the sake of conceptual clarity, but typically, system 10 comprises either the transmission configuration or the reflection configuration. In such embodiments, in the reflection mode, source assembly 151 is used for directing an incident X-ray beam 152 to the upper surface of wafer 22 at an incident angle 154 between the beam and the upper surface of wafer 22 (e.g., between about 25° and 35°), and are diffracted by the crystallographic planes of the wafer, and exit from the upper surface wafer 22 as an X-ray beam 153 at an angle 155 that may have the same size of angle 154 (or may have a different size depending on the orientation of the crystallographic planes, which is detected by detector assembly 141 (in high-speed imaging mode) or by camera 46 (in high-resolution imaging mode). It is noted that both configurations of transmission mode and reflection mode are presented in the same figure, in order to show that the techniques described below are applicable for both transmission mode and reflection mode, and may be implemented in both configurations. Detector assembly 141 and camera 46 are described in detail herein.

In the example of FIG. 1, the high-speed imaging mode is used in the transmission-mode XRDI, and the high-resolution imaging mode is used in the reflection-mode XRDI, but both high-speed and high-resolution imaging modes may be used (with some limitations described in FIG. 2 below), in both transmission-mode XRDI and reflection-mode XRDI.

In some embodiments, detector assembly 141 is configured to produce an electrical signal in response to detecting X-ray photons of X-ray beam 144 diffracted from wafer 22. The electrical signal is transferred to processing unit 38 for performing XRD analysis, and when applicable, for producing an XRD image.

In some embodiments, detector assembly 141 comprises one or more detectors, in the present example, a single detector 140 having a two-dimensional (2D) position-sensitive X-ray camera configured to measure the X-rays diffracted through wafer 22 according to Laue geometry, as a function of the detector position with respect to the surface of the wafer. Embodiments directed to the implementation of the present invention in detector assembly 141 are described in detail in FIG. 2 below.

In other embodiments, detector assembly 141 may comprise a plurality of detectors 140, arranged in any suitable configuration. One example implementation of four detectors (such as detector 140) is described in U.S. Pat. No. 10,816,487, whose disclosure is incorporated herein by reference, but in alternative embodiments, any suitable configuration of detectors (or other sort of detectors) may be implemented in detector assembly 141.

In some embodiments, system 10 comprises a beam-stopper 130 made from an X-ray opaque material, which is mounted between wafer 22 and detector 140.

In some embodiments, beam-stopper 130 is configured to occlude a portion of the X-ray beam, which is transmitted directly (i.e., without being diffracted) through wafer 22, from impinging on the surface of detector 140. Moreover, beam-stopper 130 is configured to block undesired X-rays from being detected by detector assembly 141, and thereby, reduce the level of noise and artifacts in the aforementioned electrical signal produced by detector assembly 141.

In some embodiments, the aforementioned high-resolution X-ray camera 46, also referred to herein as a high-resolution X-ray detector assembly, typically comprises an X-ray sensitive CCD or a CMOS detector. X-ray camera 46 is typically used for imaging a selected area of wafer 22 at high-spatial resolution, e.g., having a pixel size of about 10-15 µm or smaller, so as to provide higher spatial resolution compared to that of detector assembly 141, whereas detector assembly 141 may be used for a full scanning and XRDI of wafer 22, and for other operations, such as alignment between the incident X-ray beam and wafer 22, and optionally, other sorts of calibration operations.

Embodiments directed to the implementation of the present invention in camera 46 are described in detail in FIG. 2 below.

In some embodiments, system 10 may comprise an integrated optical inspection system 50. System 10 may comprise additional integrated sensors, such as photoluminescence (PL) or Raman scattering heads (not shown), configured to provide complementary metrology or inspection capabilities.

In some embodiments, processor 34 is configured to process the electrical signal received from detector assembly 141, and to determine a diffraction intensity image of the X-ray photons captured by detector 140. Processor 34 is further configured to detect, based on the electrical signal, one or more defects in wafer 22.

In some embodiments, processor 34 is configured to control (i) stage 40, which may be moved using stepper motors, servo motors, or a suitable combination thereof, and (ii) rotation stage 150 for adjusting the angle of incident X-ray beam 106 relative to the lower surface of wafer 22.

This particular configuration of system 10 is shown by way of example, in order to illustrate certain problems that are addressed by embodiments of the present invention and to demonstrate the application of these embodiments in enhancing the performance of such an XRDI system. Embodiments of the present invention, however, are by no means limited to this specific sort of example system, and the principles described herein may similarly be applied to other sorts of X-ray analysis systems known in the art.

Figure 2:
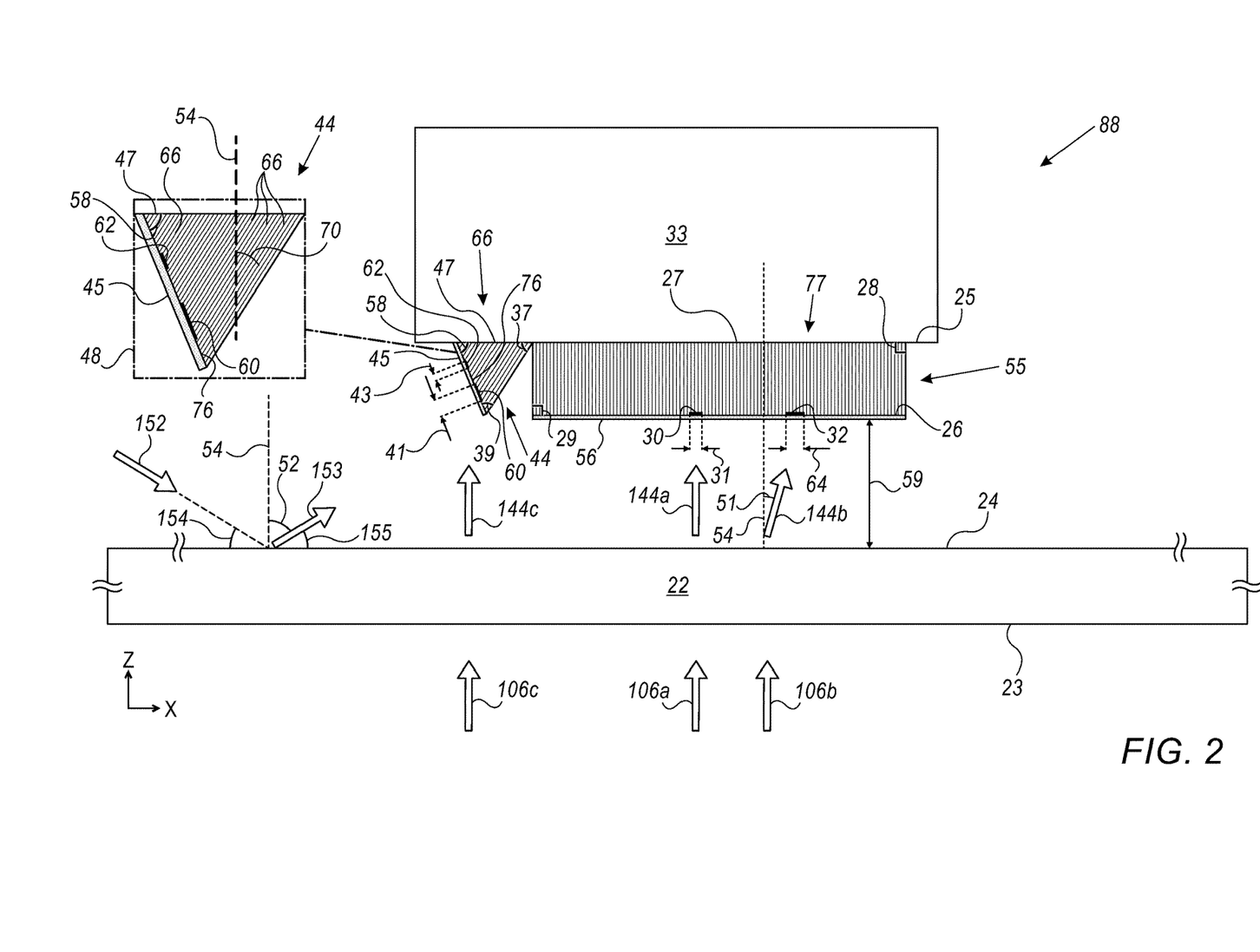
FIG. 2 is a schematic sectional view of a detector assembly of the system of FIG. 1, in accordance with an embodiment of the present invention.

Improving Resolution of X-Ray Diffraction Images Using Multiple Angled Input Faces in Detector Assembly FIG. 2 is a schematic sectional view of a detector assembly 88, in accordance with an embodiment of the present invention. Detector assembly 88 may be implemented in or replace, for example, detector assembly 141 and/or camera 46 of FIG. 1 above, but as will be described in detail below, the present invention is more effective when being implemented in camera 46 for the aforementioned high-resolution XRDI mode.

In some embodiments, detector assembly 88 comprises a single detector. Alternatively, detector assembly 88 may comprise a plurality of detectors, arranged in any suitable configuration.

In some embodiments, in the transmission mode, source assembly 101 directs incident X-ray beam 106 to a lower surface 23 of wafer 22, typically at any suitable angle between about −25° and +25° relative to a normal 54 to surfaces 23 and surface 24 (the upper and lower surfaces of wafer 22 are approximately parallel to one another). Subsequently, X-ray beams 144 are diffracted and exit from an upper surface 24 of wafer 22 at various angles, as described in FIG. 1 above. In the example of FIG. 2, incident X-ray beams 106a, 106b, and 106c are directed to three respective regions on surface 23 of wafer 22. X-ray beams 144a and 144c exit from surface 24 responsively to directing incident X-ray beams 106a and 106c, respectively. Note that X-ray beams 144a and 144c are approximately parallel to normal 54 to surface 24, or are emitted from surface 24 at one or more respective directions having, respectively, one or more small acute angle relative to normal 54. Moreover, in response to directing incident X-ray beam 106b to wafer 22, an X-ray beam 144b exits from surface 24 at an acute angle 51 relative to normal 54. It is noted that acute angle 51 is larger than the one or more small acute angles of X-ray beams 144a and 144c.

In the reflection mode, source assembly 151 directs incident X-ray beam 152 to upper surface 24, typically at any suitable angle 154 between about 25° and 35° relative to surface 24 (as described in FIG. 1 above). Subsequently, in response to directing incident X-ray beam 152 to wafer 22, X-ray beam 153 is diffracted and exits from upper surface 24 at an angle 52 (relative to normal 54) corresponding to angle 155, as described in FIG. 1 above.

In the context of the present disclosure and in the claims, the terms "about" or "approximately" for any relative or absolute numerical values or ranges indicate a suitable dimensional tolerance that allows the part or collection of components to function for its intended purpose as described herein.

In some embodiments, detector assembly 88 comprises an optical sensor 33 having a surface 25, which is approximately parallel to, and is facing upper surface 24 of wafer 22. Optical sensor 33 is configured to receive optical radiation impinging on surface 25, and to produce an electrical signal responsively to the impinged optical radiation, as described in FIG. 1 above.

In some embodiments, based on the electrical signals received from optical sensor 33, processor 34 is configured to produce XRD images of the aforementioned four regions in wafer 22.

In some embodiments, optical sensor 33 may comprise one or more charge-coupled device (CCD) or complimentary metal-oxide semiconductor (CMOS) cameras featuring X-ray sensitive scintillator screens in the case of step scanning.

In other embodiments, when applying continuous scanning to stage 40, optical sensor 33 may comprise one or more time delay integration (TDI) X-ray cameras, such as those manufactured by Hamamatsu Photonics (Hamamatsu-city, Japan), so as to increase signal-to-noise ratio (SNR) at high scanning speeds.

In some embodiments, detector assembly 88 comprises one or more fiber optic plates (FOPs), in the present example, an FOP 55 and an FOP 44 that are disposed over surface 25 of optical sensor 33.

In some embodiments, FOP 55 comprises one or more optical fibers 77 (also referred to herein as fibers 77, for brevity) disposed between an outer surface 26 and an inner surface 27 of FOP 55. In the present example, inner surface 27 is coupled with surface 25 of optical sensor 33.

In some embodiments, both surfaces 26 and 27 are approximately parallel to one another and to surface 25, and fibers 77 are parallel to one another and are approximately perpendicular to surfaces 25 and 26, i.e., having right angles 28 and 29, respectively.

In some embodiments, detector assembly 88 comprises a scintillator layer 56, which is formed over surface 26 of FOP 55, and is configured to convert X-ray beams 144 and 153 into the optical radiation. Note that in the present configuration, surface 26 and layer 56 are facing wafer 22, and therefore, receive X-ray beams 144a-144c and 153 impinging on layer 56. Therefore, surface 26 is also referred to herein as an input surface of FOP 55.

In some embodiments, scintillator layer 56 has a finite thickness (along the Z-axis) between about 10 μm and 250 μm, and in response to receiving beams 144a and 144b, layer 56 converts the X-ray photons of beams 144a and 144b to optical photons arranged on surface 26 in spots 30 and 32, respectively. In other words, spots 30 and 32 are formed by scintillator layer 56 in response to receiving beams 144a and 144b. It is noted that due to the angle relative to normal 54, spot 30 has a size 31 (e.g., a diameter along the X-axis), which is smaller than a size 64 of spot 32. In other words, beam 144a impinges on layer 56 at a right angle (or a very acute layer substantially smaller than angle 51), and therefore, spot 30 is smaller than spot 32 obtained when directing beam 144b at acute angle 51.

Moreover, in the reflection mode, beam 153 exits from surface 153 at angle 52, which is substantially larger than angle 51, and therefore, a spot (not shown) larger than spot 32 is formed on surface 26 responsively to beam 153 impinging on layer 56.

In some embodiments, fibers 77 are configured to convey the optical photons of spots 30 and 32 to surface 25, and thereby, form on surface 25 spots that are substantially similar to spots 30 and 32. In the present example, the optical radiation has a visible light (e.g., green color having a wavelength of about 550 nm) or any other suitable wavelength, and the intensity of the spots are approximately identical in surfaces 26 and 25. In other words, fibers 77 of FOP 55 cause negligible intensity loss while conveying the optical radiation between surfaces 26 and 25.

It is noted that the different directions of beams 144a and 144b affect the resolution of the XRD image produced by optical sensor 33. More specifically, the perpendicularity (or very acute angle) between beam 144a and surface 26 (and layer 56) results in a smaller size of spot 30, compared to that of spot 32, and therefore, the resolution of the XRD image produced by optical sensor 33 is higher in the region irradiated by incident beam 106a compared to the region irradiated by incident beam 106b.

In principle, it is possible to rotate wafer 22 relative to detector assembly 88 (e.g., by rotating at least one of them), but such rotation results in non-uniform distance between surfaces 24 and 26 along the Z-axis, and affects the uniformity of the XRD image produced by optical sensor 33. Moreover, such rotation may increase a working distance 59 between surface 24 of wafer 22 and the outer surface of layer 56. It is note that increasing working distance 59 results in lower resolution of the XRD image produced by optical sensor 33. In other words, a compromise has to be made in either the incident angle of beam 144 relative to surface 26, or the working distance, e.g., working distance 59 between surface 24 of wafer 22 and the outer surface of layer 56.

In some embodiments, FOP 44 has a surface 47, which is approximately parallel to and coupled with surface 25 of optical sensor 33. In some embodiments, FOP 44 has a surface 76, which is oblique to both surfaces 25 and 47. In the context of the present disclosure, surface 76 is also referred to herein as an input surface of FOP 44, and surface 47 is also referred to herein as an output surface of FOP 44. In this configuration, FOP 44 has non-parallel input and output surfaces.

As shown in the example of FIG. 2, surface 76 is extended to form an angle 58 with surfaces 25 and 47, so as to show the oblique angle therebetween (as opposed to surfaces 26 and 27 of FOP 55 that are parallel with one another). In other implementations, surfaces 76 and 47 may not physically cross one another even though being oblique to one another.

Reference is now made to an inset 48 showing FOP 44. In some embodiments, FOP 44 comprises a scintillator layer 45 disposed on surface 76 of FOP 44 and configured to convert X-ray beams 144c and 153 into optical radiation, as described above for scintillator layer 56.

In some embodiments, FOP 44 comprises (one or more) optical fibers 66, which are disposed at an acute angle 70 relative to normal 54 to surfaces 25 and 47. Optical fibers 66 are configured to convey the optical radiation generated by scintillator layer 45 to optical sensor 33.

In some embodiments, in response to beams 144c and 153 impinging on scintillator layer 45, the X-ray photons are converted to photons of optical radiation, and spots 62 and 60 of the optical radiation are formed, respectively, on surface 76 of FOP 44.

Reference is now made back to the general view of FIG. 2. In some embodiments, optical fibers 66 of FOP 44 are disposed at oblique angles relative to surfaces 47 and 76 of FOP 44. More specifically, optical fibers 66 are disposed at an oblique angle 37 relative to surface 47, and at an oblique angle 39 relative to surface 76. In the example of FIG. 2, both angles 37 and 39 are acute angles. Moreover, in some embodiments, the size of angles 37 and 39 is as similar as possible, so as to reduce distortion of the optical radiation conveyed by fibers 66.

In accordance with the embodiments described above, X-ray beam 144c is emitted from wafer 22 in a direction parallel to normal 54 and causes the formation of spot 60 having a size (e.g., diameter) 41, and X-ray beam 153 is diffracted from the sample at an oblique angle relative to normal 54, e.g., angle 52, and causes the formation of spot 62 having a size (e.g., diameter) 43, smaller than size 41 of spot 60. Therefore, the use of FOP 44 having non-parallel surfaces 47 and 76, improves the resolution of the XRD image for beam 153.

Additionally, or alternatively, in case beams 144a and 144b impinge on layer 45 of FOP 44, the spot size associated with beam 144b is typically smaller compared to the spot size associated with beam 144a. In other words, when X-ray beams are diffracted from surface 24 at an oblique angle, improved resolution of the XRD image can be obtained when using an FOP having non-parallel surfaces (such as surfaces 47 and 76 of FOP 44), instead of using FOP 55 having parallel surfaces 26 and 27.

Based on the description above, it is noted that the resolution of the XRD image can be improved by using: (i) FOP 55 for beams 144 that are approximately parallel to normal 54 (e.g., beams 144a and 144c), and (ii) FOP 44 or other suitable FOP 44 having non-parallel surfaces for beams 144b and 153 diffracted from wafer 22 at oblique angles relative to normal 54. In the present example, processor 34 is configured to improve the resolution of the XRD image by selecting spot 30 of FOP 55 and spot 62 of FOP 44. Moreover, in order to improve the resolution of the XRD image, processor 34 is configured to control stage 40 to position: (i) the region that emits beams 144a and 144c in front of FOP 55, (ii) the region from which beams 144b and 153 are diffracted, in front of FOP 44.

In some embodiments, the pixel size in high-resolution mode is between about 5 μm and 20 μm, whereas the pixel size in high-speed mode is between about 40 μm and 100 μm. In such embodiments, FOP 44 could be implemented in high-speed detector 140 of detector assembly 141, but there is less need to do that because the thickness of scintillator layer 45 is small relative to the pixel size used in the high-speed mode, so the spot broadening caused by directing beam 153 having a low incidence angle (such as angle 155) to impinge on layer 45 is less significant in such high-speed applications. Moreover, the working distance between surface 24 and detector 140 does not need to be so small because in high-speed applications, the pixel size is relatively large, so that if needed, processor 34 may control system to rotate detector assembly 141 relative to surface 24 of wafer 22. In such embodiments, the present invention is more effective when the structure of detector assembly 88 is implemented in camera 46.

In other embodiments, in the reflection configuration of system 10, when directing beam 152 and receiving diffracted beam 153 having small angle 155, detector assembly 88 may comprise only FOP 44 whose angle 58 is adjusted to angle 155, so as to obtain improved resolution of the XRDI.

In alternative embodiments, detector assembly 88 may comprise multiple FOPs 44 arranged side-by-side along the XY plane (e.g., along the X-axis in the sectional view of FIG. 2) of surface 25.

In other embodiments, detector assembly 88 may comprise multiple FOPs having non-parallel input and output surfaces, such as surfaces 76 and 47 of FOP 44, but at least two of the FOPs may have a different angle between the input and output surfaces (shown as angle 58 in inset 48). Additionally, or alternatively, at least two of the FOPs may have a different angle 37 and/or a different angle 39.

In alternative embodiments, detector assembly 88 may comprise multiple FOPs, one or more of the FOPs having input surfaces facing, at one or more acute angles, to the left relative to normal 54 (such as FOP 44 and angle 58), and one or more of the FOPs having input surfaces facing, at one or more opposite acute angles, i.e., to the right relative to normal 54. In such embodiments, the configuration of detector assembly 88 may have, for example, a symmetric structure with an additional FOP located at the opposite side (to that of FOP 44) of FOP 55 and having a mirror structure of FOP 44 rotated along the Z-axis.

In alternative embodiments, at least two of the scintillator layers assembly 88 may be different from one another for optimizing the light output and spatial resolution based on the angle of the respective FOPs. For example, scintillator layer 45, which is disposed over FOP 44, may have a different thickness compared to that of scintillator layer 56 disposed over FOP 55. Additionally, or alternatively, scintillator layers 45 and 56 may comprise different materials, so as to optimize the light output and spatial resolution based on the angles of FOPs 44 and 55, respectively. In other words, the multiple FOPs may have different scintillator thicknesses and/or materials to optimize the light output and spatial resolution based on the angles of the FOPs.

This particular configuration of FOP 44 and detector assembly 88 is shown by way of example, in order to illustrate certain problems that are addressed by embodiments of the present invention and to demonstrate the application of these embodiments in enhancing the imaging resolution of the detector assembly, and other performance of such an XRDI system. Embodiments of the present invention, however, are by no means limited to this specific sort of example FOP and detector assembly, and the principles described herein may similarly be applied to other sorts of X-ray detectors of X-ray analysis systems, and photon detectors of systems using wavelengths other than X-rays.

Figure 3:
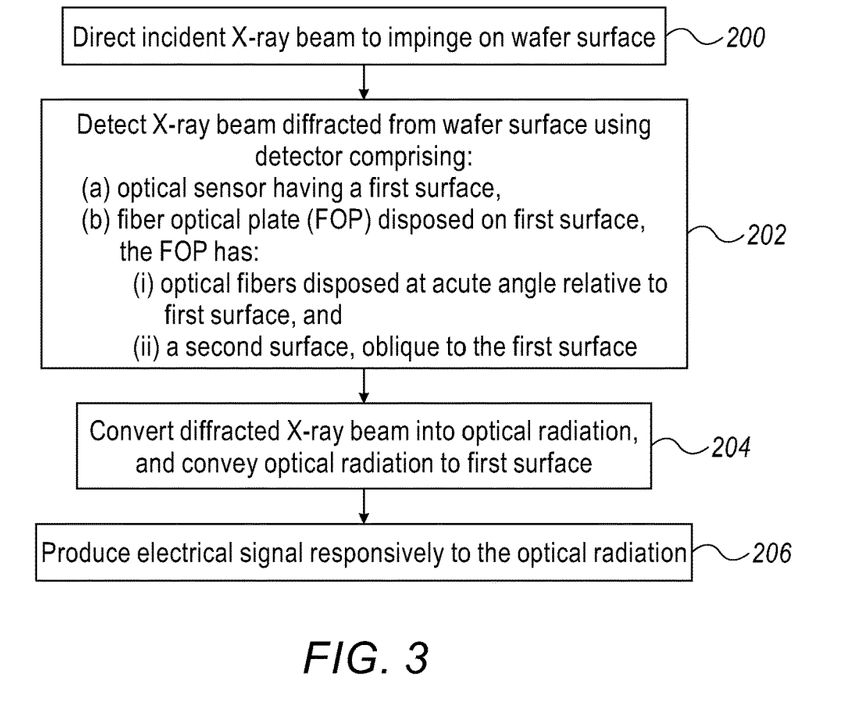
FIG. 3 is a flow chart that schematically illustrates a method for performing X-ray analysis using the detector assembly of FIG. 2, in accordance with an embodiment of the present invention.

FIG. 3 is a flow chart that schematically illustrates a method for performing X-ray analysis using detector assembly 88, in accordance with an embodiment of the present invention.

As described in FIG. 2 above, detector assembly 88 may replace, for example, detector assembly 141 and/or camera 46 of FIG. 1 above.

The method begins at an X-ray beam directing step 200, with directing an incident X-ray beam (e.g., beam 152) to impinge on surface 24 of wafer 22, as described in detail in FIG. 2 above.

At a detection step 202, X-ray beam 153, which exits from surface 24 at angle 155 and impinges on scintillator layer 45 of FOP 44, is detected. It is noted that detector assembly 88 comprises optical sensor 33 having surface 25, and FOP 44 whose surface 47 is parallel to and disposed over surface 25 of optical sensor 33, as described in detail in FIG. 2 above. Moreover, FOP 44 comprises (i) surface 76, disposed at oblique angle 58 relative to both surfaces 47 and 25, and (ii) optical fibers 66 disposed at acute angles 37 and 39 relative to surfaces 47 and 76, respectively. Detector assembly 88 further comprises scintillator layer 45 disposed on surface 76 of FOP 44, as also described in detail in FIG. 2 above.

At a beam conversion step 204, in response to having beam 153 impinging thereon, scintillator layer 45 converts the X-rays of beam 153 to optical radiation, and optical fibers 66 convey the optical radiation to surface 47, as described in detail in FIG. 2 above.

At an image production step 206 that concludes the method, optical sensor 33 produces an electrical signal responsively to the optical radiation produced and conveyed by FOP 44, and based on the electrical signal processor 34 produces the XRD image, as described in detail in FIGS. 1 and 2 above.

Figure 4:
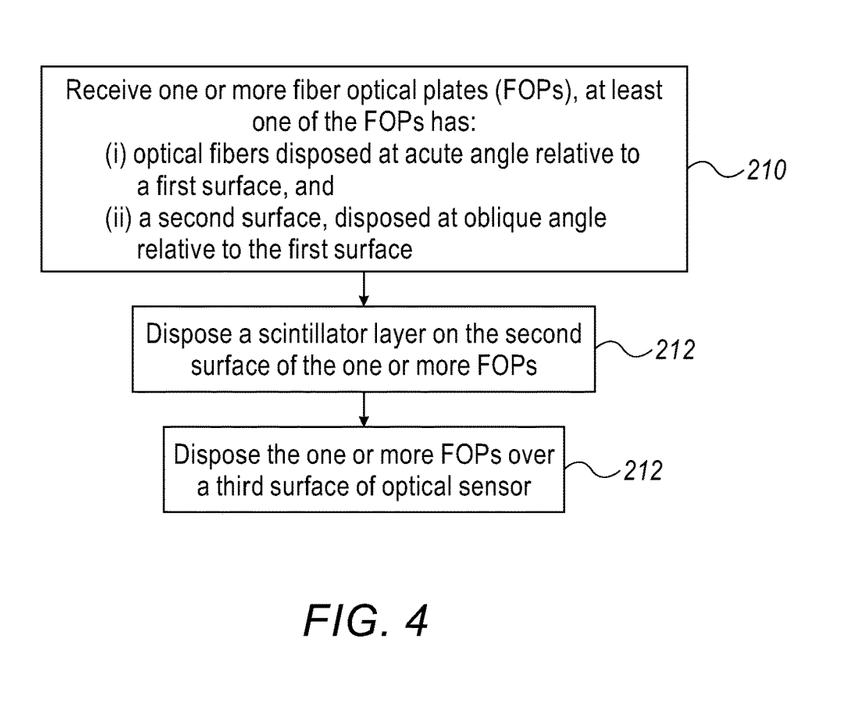
FIG. 4 is a flow chart that schematically illustrates a method for producing the detector assembly of FIG. 2, in accordance with an embodiment of the present invention.

FIG. 4 is a flow chart that schematically illustrates a method for producing detector assembly 88, in accordance with an embodiment of the present invention.

The method begins at a fiber optic plate (FOP) receiving step 210, with receiving FOPs 44 and 55, wherein FOP 44 comprises: (i) optical fibers 66 disposed at acute angle 37 relative to surface 47 (and surface 25), and (ii) surface 76, disposed at oblique angle 58 relative to surface 47, as described in detail in FIG. 2 above.

At a scintillator disposing step 212, scintillator layer 45 is disposed over surface 76 of FOP 44 and scintillator layer 56 is disposed over surface 26 of FOP 55, as described in detail in FIG. 2 above.

At FOPs disposing step 214 that concludes the method, FOPs 44 and 55 are disposed over surface 25 of optical sensor 33.

It is noted that the production method of FIG. 4 describes the essence of the production process, and omits several process steps for the sake of presentation clarity in order to focus on the key embodiments of the present invention. For example, the production method may comprise the steps of (i) producing optical fibers 66, (ii) coupling between FOP 44 and optical sensor 33, (III) shaping the components of FOP 44 (e.g., optical fibers 66), and any other sub-steps of the production process.

In alternative embodiments, the order of steps 212 and 214 may be altered, so that at least one of the FOPs is disposed over surface 25 of optical sensor 33, and subsequently, the scintillator layer is disposed over the outer surface of the respective FOP.

Although the embodiments described herein mainly address detecting and imaging topography and crystalline defects in semiconductors and compound semiconductor samples, such as wafers and other types of substrates, the methods and systems described herein can also be for detection of defects in other single crystal materials, for example those used in some high-performance optical applications.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A detector assembly of an X-ray system, the detector assembly comprising:
   an optical sensor having a sensor surface, the optical sensor configured to receive optical radiation impinging on the sensor surface, and to produce an electrical signal responsively to the optical radiation;
   a first fiber optic plate (FOP) disposed over the sensor surface of the optical sensor, the first FOP comprising:
      one or more first optical fibers disposed at an acute angle relative to a normal to the sensor surface, the one or more first optical fibers are configured to convey the optical radiation to the optical sensor; and
      a first FOP surface, which is oblique to the sensor surface;
   a second FOP disposed over the sensor surface, the second FOP comprising: (i) one or more second optical fibers disposed parallel to the normal, and (ii) a second FOP surface, which is parallel to the sensor surface of the optical sensor; and
   a first scintillator layer disposed on the first FOP surface of the first FOP and a second scintillator layer disposed on the second FOP surface of the second FOP, the first and second scintillator layers configured to convert an X-ray beam impinging thereon into the optical radiation.

2. The detector assembly according to claim 1, wherein the X-ray beam comprises: (i) a first X-ray beam emitted from a sample at a first direction having a first angle relative to the normal, and (ii) a second X-ray beam diffracted from the sample at a second direction having a second angle relative to the normal, larger than the first angle, wherein in response to receiving the second X-ray beam, the first FOP and the second FOP are configured to produce, on the sensor surface, first and second spots, respectively, and wherein the second spot is smaller than the first spot.

3. The detector assembly according to claim 2, wherein, in response to receiving the first X-ray beam, the first FOP and the second FOP are configured to produce on the sensor surface third and fourth spots, respectively, and wherein the fourth spot is smaller than the third spot.

4. The detector assembly according to claim 1, wherein the one or more first optical fibers of the first FOP are disposed at a first oblique angle relative to the sensor surface, and at a second oblique angle relative to the first FOP surface.

5. The detector assembly according to claim 4, wherein the first oblique angle and the second oblique angle are equal.

6. A system for X-ray analysis, the system comprising:
   a source assembly, which is configured to direct a first X-ray beam to impinge on a sample surface of a sample; and
   a detector assembly, comprising:
      an optical sensor having a sensor surface;
      a first fiber optic plate (FOP) disposed over the sensor surface, the first FOP comprising:
         one or more first optical fibers disposed at an acute angle relative to a normal to the sensor surface; and
         a first FOP surface, which is oblique to the sensor surface;
      a second FOP disposed over the sensor surface, the second FOP comprising: (i) one or more second optical fibers disposed parallel to the normal, and (ii) a second FOP surface, which is parallel to the sensor surface of the optical sensor; and
      a first scintillator layer disposed on the first FOP surface of the first FOP, and a second scintillator layer disposed on the second FOP surface of the second FOP,
   wherein the first and second scintillator layers are configured to convert a second X-ray beam, which is emitted from the sample responsively to the first X-ray beam, and impinges on the first and second scintillator layers, into optical radiation, wherein the first and second optical fibers in the first and second FOPs, respectively, are configured to convey the optical radiation to the optical sensor, and wherein the optical sensor is configured to receive the optical radiation impinging on the sensor surface and to produce an electrical signal responsively to the optical radiation.

7. The system according to claim 6, and comprising a processor, which is configured to perform the X-ray analysis based on the electrical signal.

8. The system according to claim 7, wherein the second X-ray beam comprises (a) a first beam emitted from the sample at a first direction, parallel to the normal, and (b) a second beam diffracted from the sample at a second direction, oblique to the normal, wherein in response to receiving the first and second beams, (i) the first FOP is configured to produce on the sensor surface first and second spots, respectively, and (ii) the second FOP is configured to produce on the sensor surface third and fourth spots, respectively, and wherein the processor is configured to use the second and third spots for performing the X-ray analysis.

9. The system according to claim 7, wherein the sample is positioned between the source assembly and the detector assembly, wherein the source assembly is configured to direct the first X-ray beam to impinge on the sample surface, and the detector assembly is configured to detect the second X-ray beam that had entered the sample at the sample surface, diffracted while passing through the sample, and exited the sample at an additional sample surface of the sample that is opposite to the sample surface, and wherein, based on the second X-ray beam, the processor is configured to produce an X-ray diffraction (XRD) image of the sample.

10. The system according to claim 9, wherein, based on the XRD image, the processor is configured to detect one or more defects in the sample, and wherein at least one of the detected defects comprises a defect in a crystal located between the sample surface and the additional sample surface.

11. The system according to claim 7, wherein the source assembly and the detector assembly are facing the sample surface of the sample, wherein the source assembly is configured to direct the first X-ray beam to impinge on the sample surface at a first acute angle, and the detector assembly is configured to detect the second X-ray beam diffracted from the sample surface at a second acute angle, and wherein, based on the second X-ray beam, the processor is configured to produce an X-ray diffraction (XRD) image of the sample.

12. A method for X-ray analysis, the method comprising:
   directing a first X-ray beam to impinge on a sample surface of a sample;
   detecting a second X-ray beam, which is emitted from the sample responsively to the first X-ray beam, using a detector assembly, comprising: (a) an optical sensor having a sensor surface, (b) a first fiber optic plate (FOP) disposed over the sensor surface, the first FOP comprising at least: (i) one or more first optical fibers disposed at an acute angle relative to a normal to the sensor surface, and (ii) a first FOP surface, which is oblique to the sensor surface, and a second FOP disposed over the sensor surface, the second FOP comprising: (i) one or more second optical fibers disposed parallel to the normal, and (ii) a second FOP surface, which is parallel to the sensor surface of the optical sensor;
   converting the second X-ray beam into optical radiation;
   conveying the optical radiation to the sensor surface of the optical sensor; and
   producing an electrical signal responsively to the optical radiation.

13. The method according to claim 2, wherein the detector assembly comprises a first scintillator layer disposed on the first FOP surface of the FOP, and a second scintillator layer disposed on the second FOP surface of the second FOP, wherein converting the second X-ray beam comprises directing the second X-ray beam to the first and second scintillator layers, and applying the first and second scintillator layers for converting the second X-ray beam into the optical radiation.

14. The method according to claim 12, wherein the second X-ray beam comprises: (i) a first beam emitted from the sample at a first direction having a first angle relative to the normal, and (ii) a second beam diffracted from the sample at a second direction having a second angle relative to the normal, larger than the first angle, wherein conveying the optical radiation comprises, in response to receiving the second X-ray beam, applying the first FOP and the second FOP for producing on the sensor surface, first and second spots, respectively, and wherein the second spot is smaller than the first spot.

15. The method according to claim 14, wherein, in response to receiving the first beam, applying the first FOP and the second FOP for producing on the sensor surface, third and fourth spots, respectively, and wherein the fourth spot is smaller than the third spot.

16. A method for producing a detector assembly of an X-ray system, the method comprising:
   receiving a fiber optic plate (FOP) comprising: one or more optical fibers disposed at an acute angle relative to a normal to a first surface of the FOP, and a second surface of the FOP, which is oblique to the first surface;
   disposing, on the second surface of the FOP, a scintillator layer for converting an X-ray beam into optical radiation; and
   disposing the FOP over a sensor surface of an optical sensor for conveying the optical radiation to the optical sensor.

17. The method according to claim 16, and comprising disposing the one or more optical fibers at a first oblique angle relative to the first surface of the FOP, and at a second oblique angle relative to the second surface of the FOP.

18. The method according to claim 17, wherein the first oblique angle and the second oblique angle are equal.

* * * * *